Dec. 31, 1935.    B. SMITH    2,025,910
ENGINE STARTING MECHANISM
Filed Dec. 18, 1930
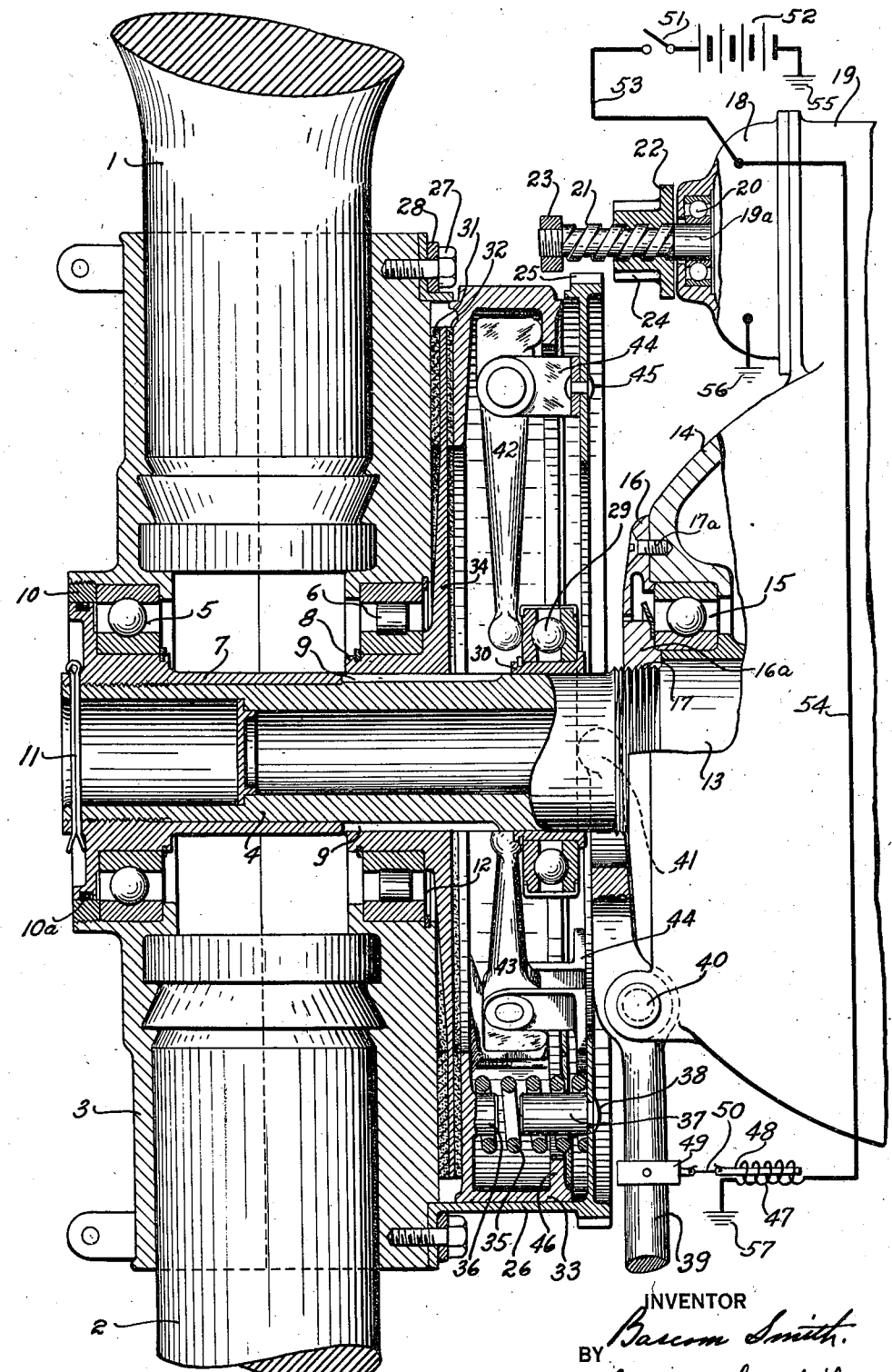
INVENTOR
BY *Bascom Smith*
*Stephen Gerstvik*
ATTORNEY Patented Dec. 31, 1935

2,025,910

UNITED STATES PATENT OFFICE 2,025,910

ENGINE STARTING MECHANISM

Bascom Smith, East Orange, N. J., assignor to Eclipse Aviation Corporation, East Orange, N. J., a corporation of New Jersey Application December 18, 1930, Serial No. 503,281

14 Claims. (Cl. 123—179)

The present invention relates to engine starting means, and more particularly to starting mechanism adapted for use with aircraft engines.

One of the objects of the invention is to provide a novel engine starter of the inertia type, which is compact, efficient and positive in operation, and requiring a minimum number of parts.

Another object is to provide a novel engine starter of the inertia type, embodying an inertia device adapted for free rotation on the crank shaft of the engine to be started and to be driven by the engine after the latter is operating under its own power.

Another object is to provide novel aircraft engine starting mechanism whereby the engine may be quickly and easily started from the cockpit or control room of the aircraft.

Another object is to provide novel aircraft engine starting mechanism embodying means whereby the propeller may be employed as an inertia element to start the engine from the operator's or pilot's seat.

A further object is to provide in a novel aircraft engine starter of the inertia type embodying the propeller as the inertia member, means whereby the propeller may be rotated free of the engine crank shaft to store energy in said propeller and thereafter drivably connected to said crank shaft to start the engine.

A still further object is to provide novel aircraft engine starting mechanism which includes in combination with the propeller of the aircraft, means for rotating the propeller independently of the propeller shaft to store energy in said propeller, and means for thereafter drivably connecting the propeller to the shaft to impart the stored energy to the engine crank shaft, whereby the engine is started.

Still another object of the invention is to provide novel aircraft engine starting mechanism which includes the propeller of the aircraft, means for rotating the propeller independently of its shaft to store energy therein, and novel means for thereafter drivably connecting the propeller to its shaft without causing longitudinal movement of said propeller to impart energy stored in the latter to the engine crank shaft, whereby the engine is started.

The above and other objects and advantages will appear more fully hereinafter from a consideration of the detailed description which follows, together with the accompanying drawing, wherein is illustrated one embodiment of the invention. It is to be expressly understood, however, that the drawing is for the purpose of illustration and description only, and is not designed as a definition of the limits of the invention, reference being had for this purpose to the appended claims.

The single figure of the drawing is a partial, axial sectional view, with parts broken away, of one form of starting mechanism embodying the present invention.

Referring to the drawing, the starting mechanism is of the type wherein an inertia member is rotated and brought up to a predetermined speed to store energy therein and thereafter drivably connected to the engine crank shaft for imparting the stored energy to the latter, whereby the engine is started.

In the form shown, the inertia member is constituted by the propeller having blades 1 and 2, portions of which are broken away, and mounted in a hub 3, the latter being free to rotate on the propeller shaft 4 by means of ball bearing 5 and roller bearing 6, which are interposed respectively between the hub member, and a sleeve member 7 having threaded engagement with the shaft 4, and the hub portion 8 of a disc clutch member to be described more fully hereinafter. The clutch member is mounted for longitudinal movement on the shaft 4, as by means of splines 9. The roller bearing 6 is arranged to permit such longitudinal movement of said disc clutch member by securing the outer race to the hub member 3 and the inner race to the clutch member, while the roller 6 is seated in the inner race to permit slight longitudinal movement between the roller and the outer race. Bearing retainer 10 is threaded into the outer portion of the hub for holding ball bearing 5 in place, and a cotter pin 11 is provided for preventing sleeve member 7 from working loose on shaft 4. A gland 10a of some suitable material, as for example felt, leather or fibre, is provided and inserted between the bearing retainer 10 and the flange of sleeve member 7 to prevent dirt from getting into bearing 5. A ring 12 is provided on the inner side of the hub for holding in place the outer race of roller bearing 6. It will be apparent that ball bearing 5, in cooperation with the sleeve member 7, prevents longitudinal movement of the hub 3 on the shaft 4.

Blades 1 and 2 and hub 3 are adapted to be drivably connected to shaft 4 in a manner to be described more fully hereinafter, but are also adapted for free rotation on said shaft, the latter being drivably connected to or formed integral with the engine crank shaft, a portion of which is shown at 13.

The engine crank shaft is journaled in the engine casing 14 in any suitable manner as for example by means of a ball bearing 15 which is held in place by a bearing retainer 16a threaded on the propeller shaft as indicated at 17, and by member 16 secured to the casing in any suitable manner, as for example by screws 17a.

Means are provided for rotating the propeller blades and hub on shaft 4 when the driving connection referred to above is rendered ineffective, that is, when said blades and hub are freely rotatable on the shaft, in order to store energy in the propeller for subsequent use in cranking and starting the engine. In the form shown, said means comprise an electric motor 18 supported in a housing 19 which may be secured to or formed integral with the engine casing 14. The armature shaft 19a of the electric motor is journaled in the motor casing in any suitable manner, as by means of a ball bearing 20, and is provided at its outer end with screw threads 21 which, together with an internally threaded pinion 22, correspond to a type of transmission mechanism well known in the engine starting art; said pinion being adapted for longitudinal movement along the threaded portion of the armature shaft 19a when the latter is rotated. A suitable nut 23 is secured to the end of the armature shaft to limit the movement of the pinion 22. The teeth 24 of the latter are adapted to mesh with gear teeth 25 formed on the periphery of a driving barrel 26 which is secured to the hub member 3 in any suitable manner, as by means of screws 27 and a ring 28. A thrust bearing 29 is provided within the driving barrel and adapted for longitudinal movement along the shaft by means of a bushing 30 for a purpose which will appear hereinafter.

As will be understood by those skilled in the art, motor 18 is effective to move pinion 22 into driving engagement with teeth 25 on the driving barrel 26, causing the barrel, the hub, and the blades to rotate, whereby energy is stored therein. Suitable gearing may be provided between the hub and the electric motor so that the propeller may be brought up to the required speed without necessitating extremely high speeds of either the pinion 23 or the armature of the motor.

Means are provided whereby, after the propeller has been brought up to a predetermined speed, as for example 300 R. P. M., the same may be drivably connected with the engine crank shaft for imparting the stored energy to said crank shaft to start the engine. In the form shown, said means comprise a clutch which, in the illustrated embodiment, is constituted by a friction disc 31 secured to the hub member in any suitable manner, and a similar friction disc 32 secured to a hollow shell 33 which is arranged for longitudinal movement within the driving barrel 26. To permit such longitudinal movement while at the same time insuring rotation of the elements 26 and 33 as a unit, an aperture or slot is provided in the upper surface of the barrel 26, and through said slot or aperture there projects a longitudinal ridge formed on the outer surface of the shell 33, as indicated, at a point just above the upper end of the lever 42. A disc 34, which is interposed between the friction discs 31 and 32 and in engagement therewith, is splined on propeller shaft 4. If desired, the friction elements 31 and 32 of the clutch may both be secured to member 34, in which case the clutching action will occur between the shell 33 and the inner face of hub 3 through the member 34.

The clutch discs are normally maintained in engagement with each other by means of a plurality of circumferentially spaced coil springs, one of which is shown at 35, said springs encircling projecting lugs 36 formed integrally with or secured to the wall of the shell 33, and lugs 37 secured to the wall of the driving barrel in any suitable manner, as by riveting, as shown at 38. It will be seen that the thrust of the springs normally retains the friction elements of the clutch in driving engagement whereby a driving connection is established between the shaft and the propeller.

Means are provided for disengaging the friction elements of the clutch during the time that the propeller is being brought up to speed by means of the electric motor, and in the embodiment illustrated, said means comprise a forked actuating lever 39 pivotally mounted on engine casing 14, as indicated at 40, one of the prongs 41 of the forked lever being broken away. Upon motion of the lower arm of the lever 39 to the right as viewed in the drawing, prongs 41 move the thrust bearing 29 to the left along the shaft 4, thereby actuating a plurality of radially arranged levers, two of which are shown at 42 and 43. The latter may be pivoted in brackets 44 secured to the wall of the driving barrel in any suitable manner, as by means of rivets 45. The short arms of levers 42 and 43 abut against an inwardly extending annular flange 46 formed on the shell member 33 whereby actuation of said levers is effective to move shell 33 longitudinally to the right within the driving barrel 26 against the oppositely directed force of springs 34. The friction elements of the clutch are thus disengaged and the propeller is free to rotate on shaft 4.

The lever 39 may be provided with a connecting means such as a flexible cable (not shown) arranged to be actuated from the pilot's seat and the parts may be so constructed and related that operation of lever 39 is effective to close the circuit of the electric motor, as will be understood by those skilled in the art.

It is also desirable that means be provided whereby the rod 39 may be actuated electrically as well as mechanically and, in the form shown diagrammatically in the drawing, a solenoid 47 is provided having its armature 48 mechanically connected to the lever 39 by means of a collar 49 and a connecting rod 50. The solenoid is arranged to be energized simultaneously with the energization of the electric motor 18 and to this end a switch 51 is connected in the electrical control circuit so that upon closing of the switch the source of electrical energy such as, for example, battery 52, is connected to the electric motor by means of a lead 53 and to the solenoid 47 by means of a lead 54. One side of the battery is grounded as indicated at 55, and return circuits for the motor and the solenoid are provided by means of motor ground 56 and solenoid ground 57.

When it is desired to start the engine, the electric motor and solenoid 47 are simultaneously energized by the means above described, and due to the energization of the solenoid 47 the clutch is disengaged; but if preferred, the disengagement of the clutch may be effected by manual actuation of the lever 39. The propeller is now brought up to a predetermined speed, whereupon the lever is released and the motor de-energized, thus causing the energy stored in the propeller to be imparted to the engine crank shaft to start the engine, and the propeller thereafter being driven by the engine. As soon as the engine is operating under its own power, the driving barrel 26 overruns the pinion 22, causing the latter to be moved longitudinally out of engagement with said barrel.

There is thus provided a novel engine starting mechanism of the inertia type particularly adapted for starting air craft engines, which is efficient and positive in operation and requires a minimum number of parts, in that the propeller blades themselves are employed for storing kinetic energy therein, thereby dispensing with a separate inertia member. Also, because of the direct connection of the starting mechanism with the propeller drive, bulky gear trains or driving mechanisms are eliminated, thereby reducing the weight of the starting means and increasing the carrying load of the vehicle.

While only one embodiment of the invention has been illustrated, other changes and modifications which will now appear to those skilled in the art may be made without departing from the scope of the invention, as for example, a suitable gear train may be provided between the pinion 24 and gear 25, or between the pinion and the armature shaft of the electric motor so that any desired speed ratio may be obtained between the electric motor and the propeller. It is also to be expressly understood that the clutch may be made in various mechanical forms, as for example, a positive type clutch may be used in certain installations. Reference is therefore to be had to the appended claims for a definition of the limits of the invention.

What is claimed is:

1. In engine starting mechanism for internal combustion engines of the character employed on aircraft, the combination with the crankshaft of the engine to be started, of a propeller mounted for free rotation on an extension of said shaft, means for rotating the propeller to store energy therein, and means for thereafter drivably connecting said propeller with the crankshaft for imparting the energy stored in said propeller to the engine to crank the latter.

2. In combination, a propeller shaft, a propeller adapted for free rotation on said shaft, means for rotating said propeller on said shaft, and friction means for drivably connecting said propeller to said shaft.

3. In combination with an internal combustion engine and its crankshaft, a propeller shaft constituting, a propeller adapted for free rotation on said shaft, means for rotating said propeller on said shaft to store energy therein, and friction means for drivably connecting said propeller to said shaft.

4. In combination, a propeller shaft, a propeller adapted for free rotation on said shaft and restrained from longitudinal movement thereon, means for rotating said propeller on said shaft, and means for drivably connecting said propeller to said shaft.

5. In mechanism for starting internal combustion engines of the character employed in aircraft, the combination of a propeller arranged for free rotation on an extension of the crank shaft of the engine to be started and restrained from longitudinal motion on said shaft extension, means independent of said propeller and including a normally disengaged element for rotating said propeller to store energy therein, means including a clutch for drivably connecting said propeller to said drive shaft for starting the engine under its own power, and means for maintaining the clutch disengaged while the propeller is being brought up to a predetermined speed.

6. In combination with an aircraft propeller and a drive shaft extending therethrough, a prime mover, means for rotating said propeller independently of said drive shaft, said means including a barrel connected to the propeller hub and surrounding said drive shaft and adapted to be actuated by said prime mover, and means disposed within said barrel for drivably connecting said hub and drive shaft.

7. In combination with an aircraft propeller and a drive shaft extending therethrough, a prime mover for actuating said drive shaft and propeller to maintain the craft in flight, and means for rotating said propeller to store energy therein for subsequent transmission to said shaft for the purpose of imparting initial rotary movement thereto.

8. In combination with an aircraft propeller and a drive shaft extending through the hub thereof, a prime mover for maintaining the craft in flight through actuation of said propeller, a clutch frictionally engaging said hub to drivably connect said hub and shaft, and means for producing initial rotation of said propeller independently of said drive shaft.

9. In combination with an aircraft propeller and a drive shaft extending thereto, a prime mover for maintaining the craft in flight through actuation of said propeller, a clutch frictionally engaging the propeller hub for drivably connecting said hub and shaft, means for producing initial rotation of said propeller independently of said drive shaft, and means including a starting motor and a member positively connected to said propeller hub for producing such independent rotation of said propeller.

10. In combination with an aircraft propeller and a drive shaft extending thereto, a prime mover for maintaining the craft in flight through actuation of said propeller, a clutch frictionally engaging the propeller hub for drivably connecting said hub and shaft, means for producing initial rotation of said propeller independently of said drive shaft, means including a starting motor and a member positively connected to said propeller hub for producing such independent rotation of said propeller, and means associated with said starting motor for breaking the driving connection between it and the propeller upon development of self-operating power in said prime mover.

11. The method of rotating an aircraft propeller independently of the prime mover and drive shaft associated therewith, which comprises first, accelerating said propeller independently of said drive shaft, and then drivably connecting the propeller with said shaft to impart initial rotary movement to said shaft and prime mover.

12. In combination with an aircraft propeller and a drive shaft extending thereto, an engine for maintaining the craft in flight through actuation of said propeller, transmission means frictionally connecting said engine with said propeller, and means for producing initial rotation of said propeller independently of said transmission means, said means including a starting motor and a member positively connected to said propeller for producing such independent rotation.

13. In combination with an internal combustion engine, an aircraft propeller, means for accelerating said propeller to store energy therein with the engine shaft remaining stationary, and means for thereafter drivably connecting said propeller and shaft.

14. In combination with an aircraft propeller and a drive shaft extending thereto, a prime mover for maintaining the craft in flight through actuation of said propeller, means including a temporarily restrained friction clutch one member of which frictionally engages the propeller hub for drivably connecting said hub and shaft means for producing initial rotation of said propeller independently of said drive shaft, and means including a starting motor and a member positively connected to said propeller hub for producing such independent rotation of said propeller.

BASCOM SMITH.